(No Model.)
W. B. ROBERTS.
HOLLOW METAL WHEEL.
No. 552,719. Patented Jan. 7, 1896.
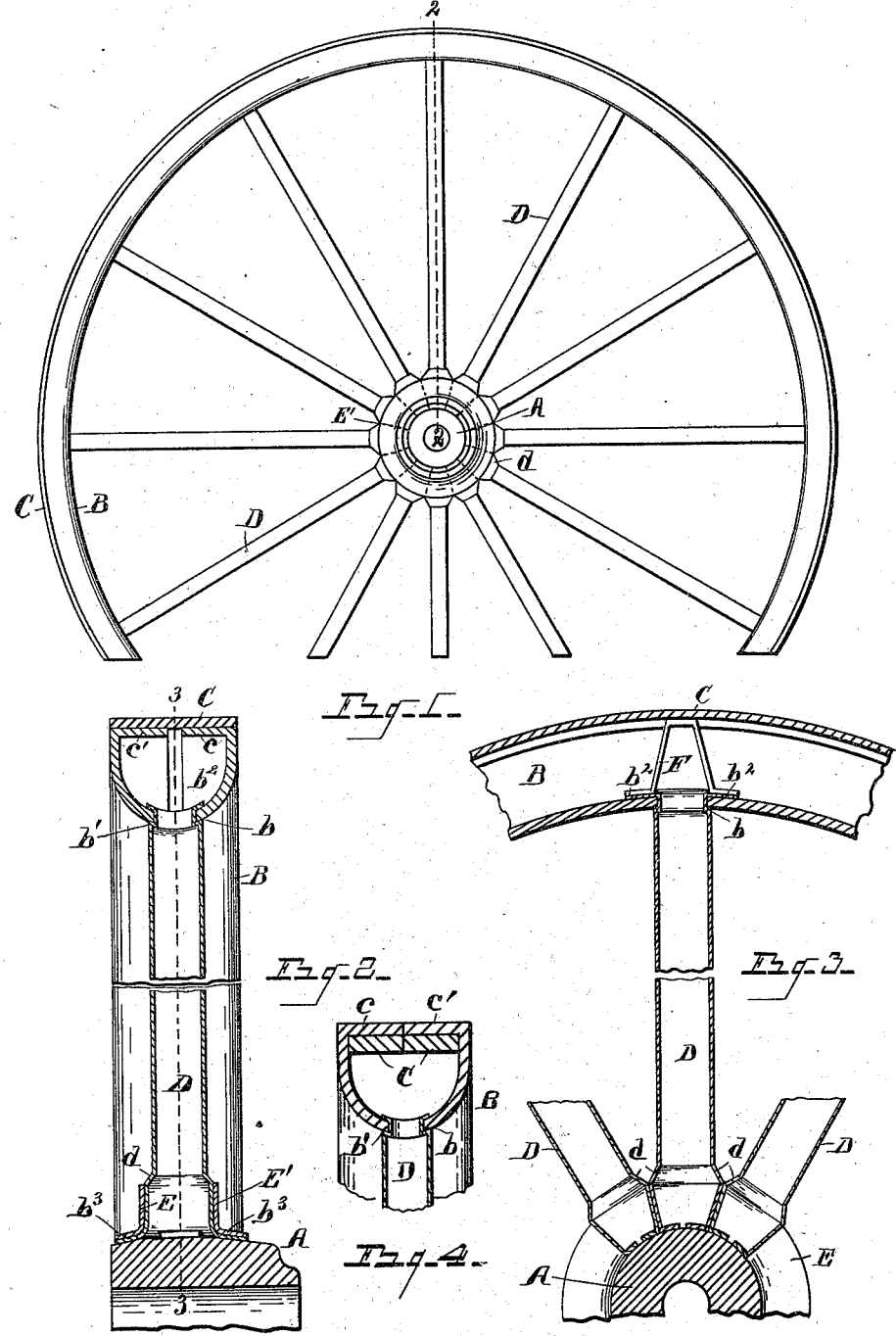
WITNESSES.
Otto B. Baenziger.
M. A. Martin.
INVENTOR.
William B. Roberts
By Newell S. Wright
His Attorney

UNITED STATES PATENT OFFICE.

WILLIAM B. ROBERTS, OF CHICAGO, ILLINOIS.

HOLLOW METAL WHEEL.

SPECIFICATION forming part of Letters Patent No. 552,719, dated January 7, 1896.

Application filed September 4, 1894. Serial No. 522,037. (No model.)

*To all whom it may concern:*

Be it known that I, WILLIAM B. ROBERTS, a citizen of the United States, residing at Chicago, county of Cook, State of Illinois, have invented a certain new and useful Improvement in Hollow Metal Wheels; and I declare the following to be a full, clear, and exact description of the invention, such as will enable other skilled in the art to which it appertains to make and use the same, reference being had to the accompanying drawings, which form a part of this specification.

My invention has for its object a hollow metal wheel for vehicles and analogous uses, and is designed to provide a wheel of this description of greater strength, durability, and of lighter heft than wheels heretofore made.

My invention consists of the construction, combination, and arrangement of devices and appliances hereinafter specified and claimed, and illustrated in the accompanying drawings, in which—

Figure 1 is a view of the wheel in side elevation, parts being broken away. Fig. 2 is a section on the line 2 2 of Fig. 1. Fig. 3 is a section on the line 3 3 of Fig. 2. Fig. 4 illustrates a modification of the manner of engaging the felly and the tire.

My invention contemplates the construction of a wheel entirely of metal and in which the spokes and felly are made of hollow metal, as of steel or any other desired metal.

My invention also contemplates an improved attachment of the tire to the felly and also of the spokes to the felly and to the hub.

I carry out my invention as follows:

A represents the hub of the wheel, which may be made of metal in any desired manner. Any ordinary metal hub may be employed.

B represents the felly. The felly is made hollow or chambered, as indicated in Figs. 2 and 3.

C represents the tire engaged upon the felly. The felly is preferably constructed of a band of metal bent into proper form and formed with inwardly-turned flanges $c$ $c'$ upon the periphery thereof. I prefer that the tire should be welded upon the outer face of said flanges—that is to say, upon the outer face or periphery of the felly. Welding of the tire may be accomplished in any suitable manner.

D represents the spokes. These spokes are made of hollow metal of proper shape. At their outer ends the spokes are preferably welded to the metal felly. To accomplish this end I prefer also to construct the felly with suitable orifices, as indicated at $b$, through which is projected the outer end of the corresponding spoke. The outer extremities of the spokes are each constructed with a shoulder, as at $b'$, upon which shoulder the felly is seated. The end of the spoke extended within the felly is constructed to be bent laterally, forming flanges $b^2$ within the felly, which flanges are welded upon the adjacent face of the felly. Thus the extremity of each spoke may be kerfed to form four flanges extending in four different directions within the felly. Two of the flanges may extend longitudinally of the felly and the other two would extend at right angles and being shorter than the longitudinally-extended flanges. These flanges may be welded to the felly in any suitable manner.

At their opposite ends the spokes are each constructed with flanges, also, as shown at $b^3$, said latter flanges being conformed in shape to the periphery of the hub and also being welded upon the hub. The extremities of the spokes adjacent to the hub are provided with flanges resting on top of the hub, a portion of said flanges being preferably turned inward. The spokes, toward their inner ends, are also constructed with a shoulder, as shown at $d$.

Over the flanges $b^3$ upon each side of the spokes are engaged metal bands E E', concealing said flanges. These flanges are snugly fitted into place and preferably extend upward a little distance upon the spokes.

A wheel may thus be made having the same general appearance of the ordinary wooden wheel, while at the same time it will be stronger, lighter, and more durable, and there will be no liability of the tire working off.

I contemplate as coming within the scope of my invention a support within the tire. (Indicated at F.) The wheel may be made either with or without said support. So also my invention contemplates any felly provided with an interior chamber or made hollow within, whether the inner chamber be in the form of a single compartment or whether it is divided into more than one compartment.

Certain features of my invention, hereinbefore described and illustrated, may be employed in wheels of various constructions.

In Fig. 2 I have shown the flanges of the felly welded to the inner surface of the tire. In Fig. 4 the tire is represented as being split in two and welded to the inner faces of the flanges of the felly. My invention contemplates splitting the tire in two and welding the parts either on top or below the flanges of the felly and then joining or welding the adjacent edges of the tire and of the flanges of the felly; but I would have it understood that the tire may be united to the felly in any desired manner or by any desired process.

It is evident that by welding together the inner edges of the flanges $c$ $c'$ of the felly an independently formed tire might be omitted, as such a construction of the felly would form in and of itself a tire. As so formed the flanges might be made of any desired thickness.

I would have it understood that such a construction comes within the scope of my invention.

It will be understood that the metal bands E E' are applied in a heated condition and in cooling contract so as to set very firmly upon the hub over the flanges $b^3$ of the spokes.

What I claim as my invention is—

1. In a wheel, the combination of a metal chambered felly, a metal hub, chambered metal spokes provided with flanges at their outer ends united to the inner face of the felly and formed with a shoulder toward their outer ends upon which the felly is seated, said spokes constructed with flanges $b^3$ at their inner ends shaped to conform to the shape of the hub and resting directly upon the outer surface of the hub, and bands E E' located upon the hub and over said flanges, said bands firmly engaging said flanges upon the underlying hub, substantially as set forth.

2. In a wheel, the combination of a hub, a metal chambered felly, chambered metal spokes united to the felly and constructed with flanges $b^3$ resting directly upon the outer surface of the hub, and a band located on the hub over said flanges of the spokes, engaging said flanges on the underlying hub, substantially as set forth.

3. In a wheel, the combination of a metal hub, a chambered metal felly, chambered metal spokes united to the felly, and constructed with flanges $b^3$ resting directly upon the outer surface of the hub, and bands E E' located upon the hub over said flanges of the spokes, substantially as set forth.

4. In a wheel, the combination of a metal chambered felly having supports therewithin, a metal hub, chambered metal spokes united at their outer ends to the felly, said spokes constructed with flanges at their inner ends shaped to conform to the contour of the hub and resting directly upon the outer surface of the hub, and bands located upon the hub over said flanges to engage the spokes upon the underlying hub, substantially as set forth.

5. In a wheel, the combination of a chambered metal felly constructed with inwardly extended flanges upon its periphery and an independently formed metal tire, said tire formed in two parts, welded to said flanges, the inner edges of said flanges and of said parts of the tire also welded together, substantially as set forth.

6. In a wheel, the combination with a chambered metal felly having supports therewithin, of a hub, and chambered metal spokes constructed with flanges at their outer ends united to the inner face of the felly, said supports at their base resting upon said flanges of the spokes, substantially as set forth.

In testimony whereof I sign this specification in the presence of two witnesses.

WILLIAM B. ROBERTS.

Witnesses:
J. R. McGURREN,
J. L. DODD.